United States Patent [19]

Okubo et al.

[11] Patent Number: 5,161,989

[45] Date of Patent: Nov. 10, 1992

[54] EJECTOR EQUIPPED CARD CONNECTOR

[75] Inventors: Isao Okubo, Kawasaki; Kazuo Ikenaka, Machida; Jon C. Schenberger, Sagamihara, all of Japan

[73] Assignee: ITT Corporation, Secaucus, N.J.

[21] Appl. No.: 793,067

[22] Filed: Nov. 15, 1991

Related U.S. Application Data

[63] Continuation-in-part of Ser. No. 663,353, Mar. 4, 1991.

[30] Foreign Application Priority Data

Nov. 30, 1990 [JP] Japan .................................. 2-340605

[51] Int. Cl.⁵ .......................................... H01R 13/62
[52] U.S. Cl. ...................................... 439/159; 439/64
[58] Field of Search ............................ 439/152-160, 439/372, 64

[56] References Cited

U.S. PATENT DOCUMENTS

| | | | |
|---|---|---|---|
| 4,778,401 | 10/1988 | Boudreau et al. | 439/157 |
| 4,952,161 | 8/1990 | Komatsu | 439/159 |
| 5,011,420 | 4/1991 | Sakamoto | 439/152 |
| 5,026,296 | 6/1991 | Hashiguchi | 439/159 |
| 5,051,101 | 9/1991 | Komatsu | 439/159 |

*Primary Examiner*—David L. Pirlot
*Attorney, Agent, or Firm*—Thomas L. Peterson

[57] ABSTRACT

An ejector-equipped card connector is disclosed, which is of small thickness and simple but reliable construction, and which avoids tilting and twisting of the memory card as it is ejected. The card connector includes a lever (8, FIG. 2) with a middle pivotally mounted (at 120) on the connector housing and a first end coupled to an eject button (21) which pivots the lever. The lever has a second end (124) coupled to a moveable plate (7) with pushouts (14) at its rear end for engaging the rear end of the card (5) to eject it. The second end of the lever has an hourglass-shaped aperture (10), and the moveable plate (7) has a downwardly bent claw (11) that projects into the hourglass aperture, so the convex surfaces of the aperture can push the moveable plate forwardly and rearwardly. The moveable plate has a slot forming a leaf spring (12) extending at an upward incline to contact the lower surface of the card to ground it. Electrically conductive grounding members (27) are mounted in the housing and biased upwardly against the bottom of the moveable plate to ground it. The middle of the lever is downwardly-depressed to form a shaft (20) that is pivotally mounted in a hole in a fixed base plate (1) of the housing, the lever middle having a pair of holddown projections (25, 26) holding the middle of the lever down to the base plate.

8 Claims, 9 Drawing Sheets

EJECTOR EQUIPPED CARD CONNECTOR

CROSS REFERENCE TO RELATED APPLICATION

This is a continuation-in-part of U.S. patent application Ser. No. 07/663,353 filed Mar. 4, 1991, allowed Apr. 15,1992.

BACKGROUND OF THE INVENTION

1. Field of the Invention

The present invention relates to a card connector for an integrated circuit memory card or the like, which has an ejector mechanism of reduced thickness and enhanced durability.

2. Description of the Prior Art

A common type of card connector includes a cavity into which a card is inserted, until multiple contacts at the rear of the card mate with corresponding contacts at the rear of the connector. The connector may be constructed so that the front edge of the card does not project, or does not project far, out of the frame to assure close guiding of the card and avoid tampering with it while it is connected. An ejector mechanism includes a button which is depressed to move it rearwardly, and which is connected through a linkage to an ejector which pushes against the rear edge of the card. The ejector moves the card far enough to unmate the contacts and to enable a person to grasp the card to pull it out. Recently, card contacts have been placed very close together, and the card has been very closely guided into position to assure proper engagement of the card and card connector contacts. Commonly used ejector mechanisms do not move the card rearwardly with sufficient precision to avoid jamming and consequent slight twisting of the card which can damage thin-high density contacts. An eject mechanism which ejected the card in a precisely controlled symmetrical manner would be of considerable value. Such an eject mechanism should be of low height to enable its use in electronic devices of small thickness, and should have a simple and highly durable construction.

SUMMARY OF THE INVENTION

In accordance with one embodiment of the present invention, a card connector with ejector is provided, wherein the ejector accurately ejects the card to avoid jamming and twisting, and is constructed of low height, high simplicity, and high durability. The card connector includes a housing that guides a memory card or the like in rearward and forward movement. A lever has a middle pivotally mounted on the housing, a first lever end pivotally coupled to an eject button that can be depressed to pivot the lever, and a second lever end connected to a moveable plate. The moveable plate lies immediately above the lever and has a rear portion with pushouts that engage the rear of the card to eject it from the card connector. The lever second end has an aperture (10) with a convex rear edge, and the moveable plate has a claw (11) that is bent downwardly to project into the lever aperture and engage its convex rear edge. The lever is formed of a piece of sheet metal and its middle portion has a downwardly-depressed wall forming a shaft (120) that is received in a hole of a base plate (1) of the housing. The moveable plate can include a slot forming an upwardly inclined leaf spring (12) that contacts the bottom of the card to discharge any static electrical charge, and a grounding member (27) can be mounted in the housing below the plate and biased upwardly thereagainst to ground the moveable plate.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
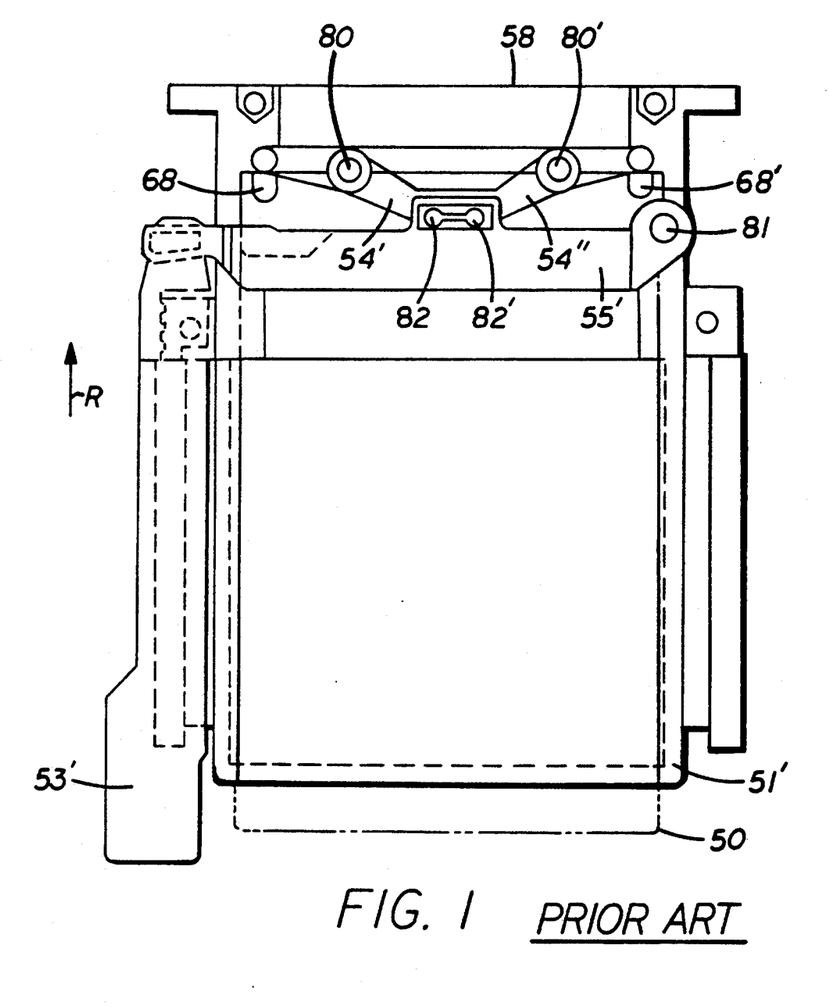
FIG. 1 is a simplified plan view of a card connector constructed in accordance with the prior art.

FIG. 1 illustrates a prior art card connector designed to receive a card 50 by moving the card in a rearward direction R into the connector. The card is of the type that includes integrated circuits connected to multiple contacts at the rear of the card. To eject the card, an eject button 53' is depressed in the rearward direction R. This causes a lever 55' which is pivotally mounted by a shaft 81 on the card connector housing 51', to pivot. A pair of card ejectors 54', 54" are mounted by shafts 80, 80' on the connector housing. One end 82, 82' of each card ejector is coupled to the lever to be pivoted thereby, and has an opposite end near card locations 68, 68' to engage those card locations and eject the card. Thus, when the ejector button 53' is moved rearwardly, the ejectors 54', 54" press the rear ends of the card forwardly a short distance, to disconnect contacts at the rear of the card from contacts of a terminal section 58 of the card connector, and move the front end of the card forwardly so it can be grasped to pull out the entire card.

It is noted that as the eject button is depressed, the end 82 of ejector 54' is moved rearwardly slightly further than the end 82' of ejector 54". This causes the card location 68 to be pressed rearwardly slightly more than the other locations 68'. This can lead to jamming of the card so it cannot move forwardly, and can result in further forces against the card location 68 causing twisting of the rear end of the card and consequent damage to it.

Figure 2:
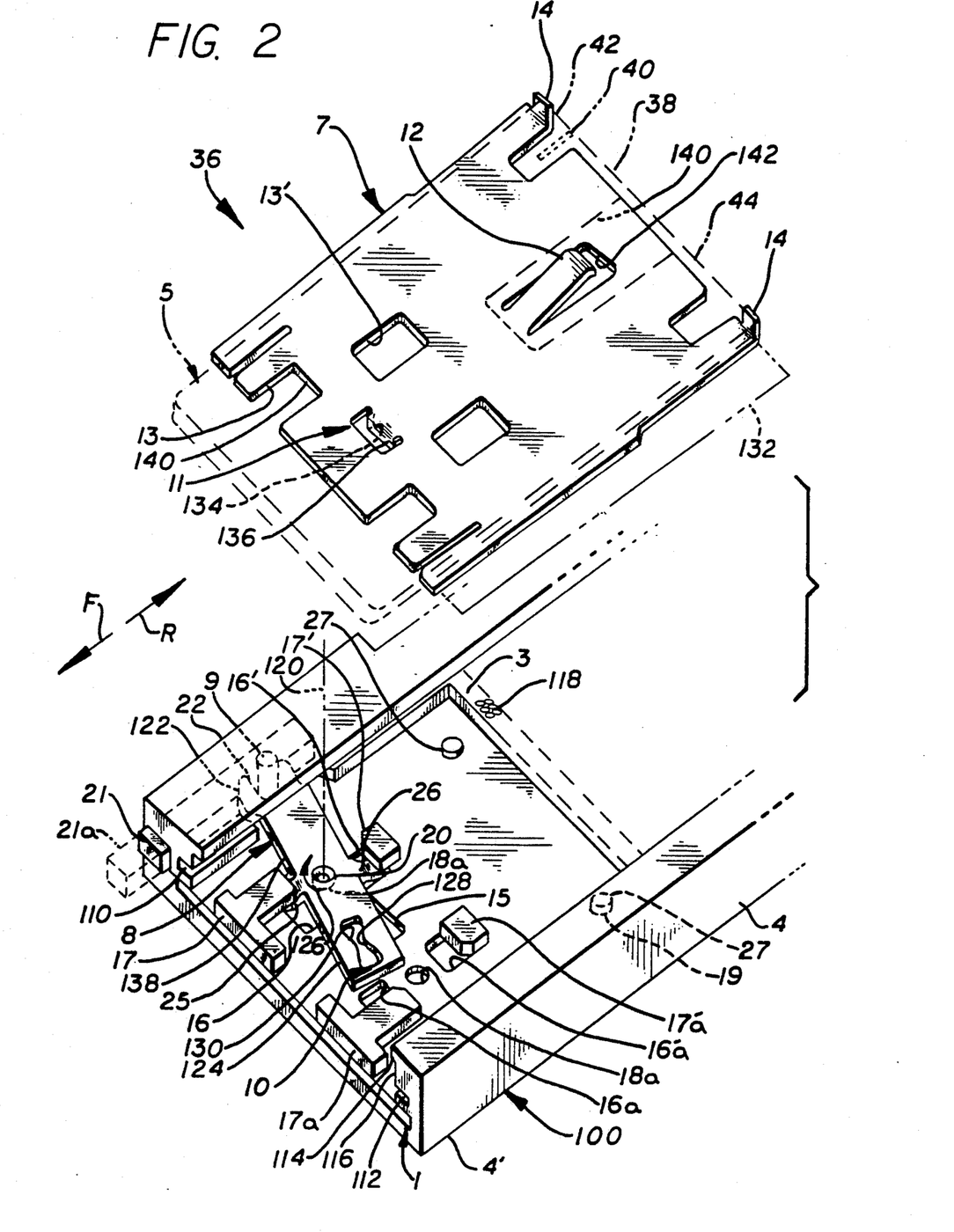
FIG. 2 is a partial exploded isometric view of a card connector constructed in accordance with a first embodiment of the present invention.
Figure 3:
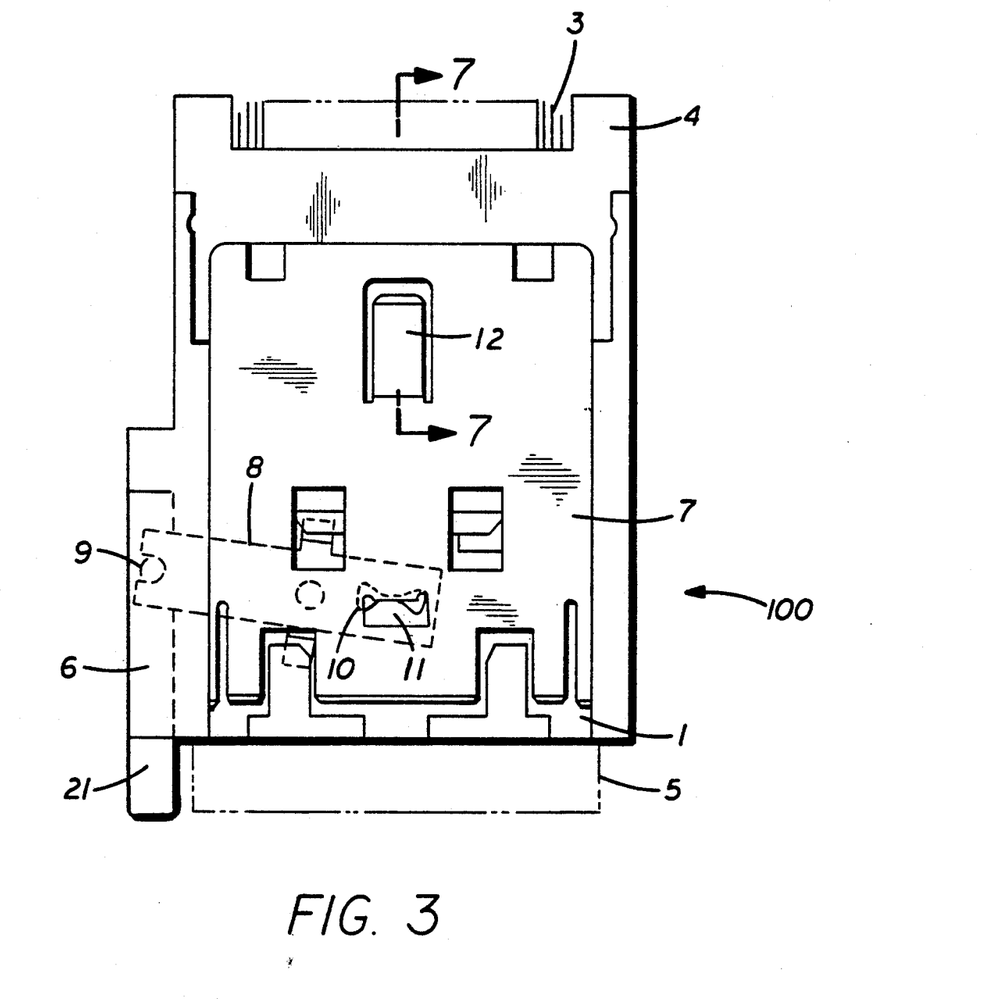
FIG. 3 a plan view of the card connector of FIG. 2.
Figure 4A:
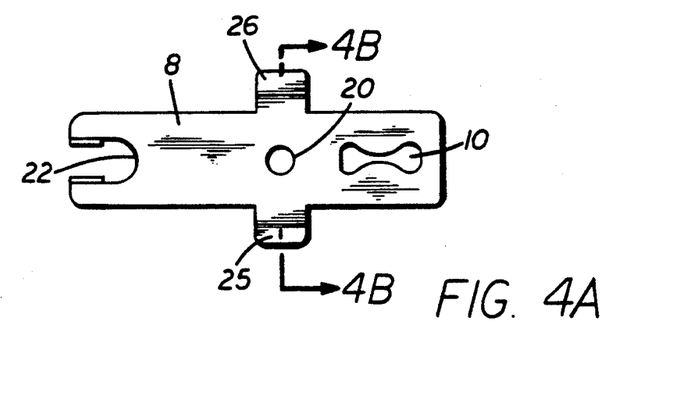
FIG. 4A is a plan view of a lever of the card connector of FIG. 1.
Figure 4B:
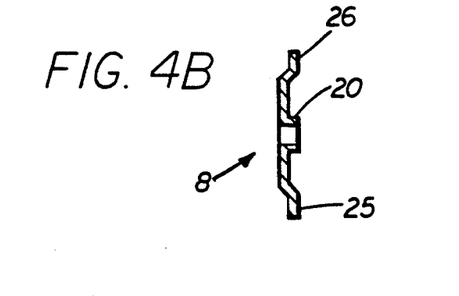
FIG. 4B is a view taken on the line 4B—4B of FIG. 4A.
Figure 5:
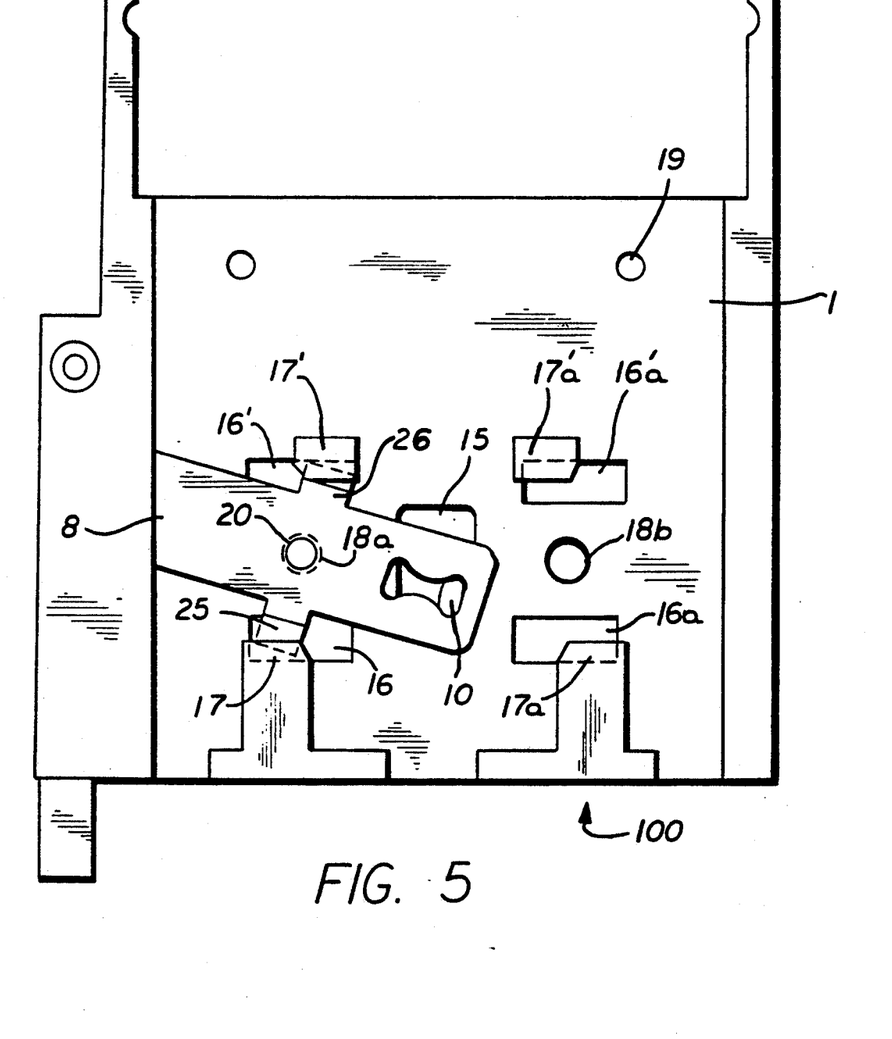
FIG. 5 is a plan view of the ejector of FIG. 2, without the moveable plate thereon.
Figure 6:
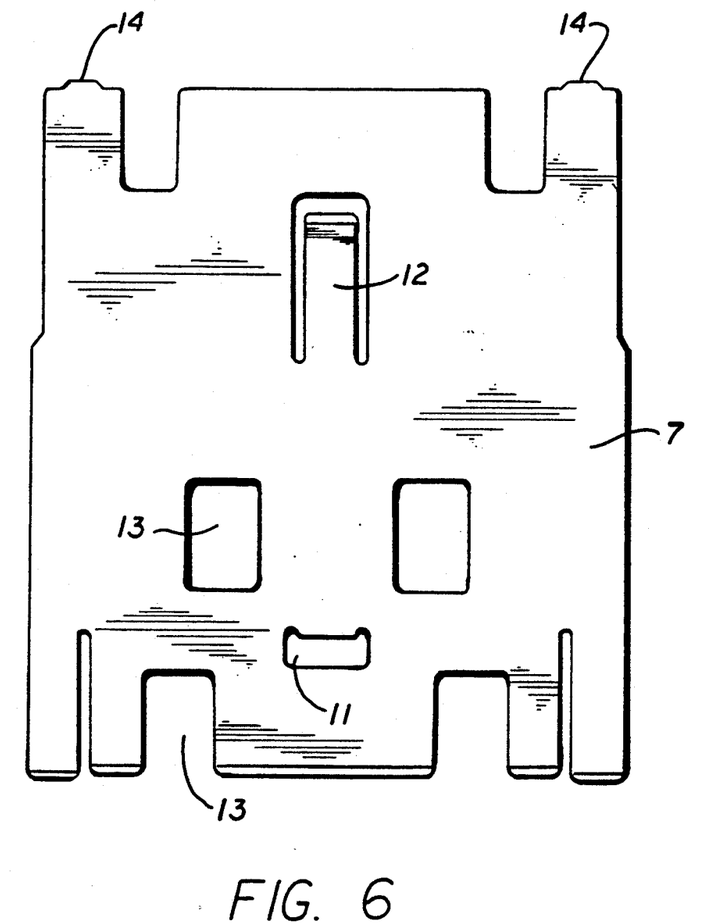
FIG. 6 is a plan view of the moveable plate of FIG. 2.
Figure 7:
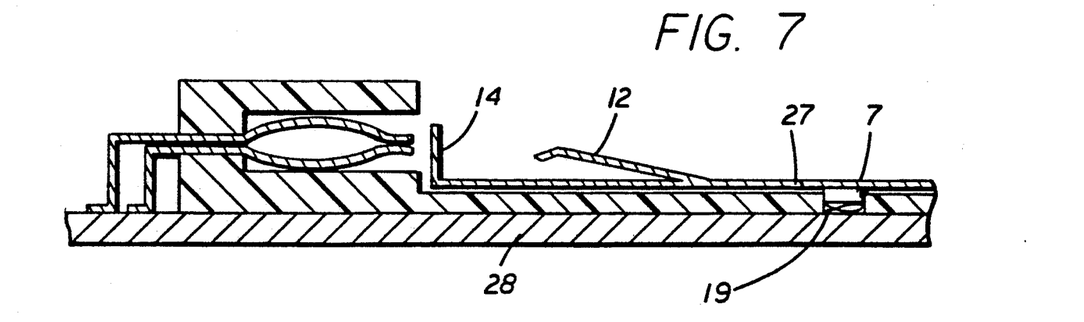
FIG. 7 is a sectional view taken on the line 7—7 of FIG. 3.

FIG. 2 illustrates an ejector-equipped card connector 36 of the present invention which receives and ejects a memory card or the like 5. The card 5 has a rear end 38 with multiple card contacts 40 and with side portions 42, 44 extending sidewardly beyond the rows of card contacts. The card lies immediately over an ejector or moveable plate 7, with the side portions of the card engaged with, or pushout regions 14 of the ejector plate. The ejector plate 7 is slidably mounted in guide tracks 110, 112 in a housing 100 of the card connector. The housing has rear and forward end portions 4, 4'. The housing has guide lips 114 extending over opposite sides of the card to form a guideway 116 that guides the card in sliding movement into and out of the card connector. When the card is fully inserted, the card contacts 40 mate with connector contacts 118 of a terminal section 3 at a rear portion of the housing. As indicated above, the card is pushed manually in a rearward direction R while closely guided by the card guideway 116, and is initially moved forwardly F by the ejector plate 7 on which the card rests.

A mechanism for moving the ejector plate 7 includes an eject button 21 which can be depressed from an initial position shown at 21a to the position shown in solid lines at 21 to move the ejector plate 7 in the forward direction F to eject the card. The eject mechanism includes a lever 8 pivotally mounted about an axis 120 on a fixed base plate or base 1 of the card connector housing 100. The lever has a first end 122 pivotally connected to the eject button 21 and has a second end 124 coupled to the ejector plate 7. When the button 21 is depressed, it pivots the lever in the direction 126, causing the second lever end 124 to move the moveable plate 7 forwardly.

The second lever end 124 has an aperture 10 of hourglass shape, forming convex rear and forward edges 128, 130. The moveable ejector plate 7 is formed of a sheet of metal with most of it (i.e. most of its upper surface) lying in an imaginary plane 132. However, the ejector plate is formed with a claw 11 where a portion of the plate is deformed to extend downwardly. The claw 11 extends through the aperture 10 in the lever. The claw has rearwardly-facing and forwardly-facing surfaces 134, 136 lying adjacent to corresponding surfaces of the aperture 10. As mentioned above, when the eject lever is pushed rearwardly in the direction R, the second lever end 124 moves largely in the forward direction F. During such movement the convex rear edge 128 of the aperture presses against the rearwardly-facing surface 134 of the claw to push the claw and ejector plate 7 forwardly. Of course, the lever second end 124 moves in an arc rather than in a precise forward direction. However, the fact that the second end of the lever has a convex edge 128 that engages the largely straight rearwardly-facing surface 134 of the claw, enables the claw and ejector plate to move precisely forwardly. The base plate 1 has a hole 15 that receives the bottom of the claw.

The lever has a middle 138 that includes a hole with downwardly-depressed hole walls that form a lever shaft 20 around the hole. The base plate 1 has a corresponding shaft hole 18a that receives the lever shaft 20 to pivotally mount the lever on the housing. In order to hold down the lever to the base plate 1 of the housing, the middle of the lever is provided with a pair of hold-down portions 25, 26 in the form of tabs that are bent downwardly to extend downwardly and then horizontally into hole portions 16, 16' in the base plate. The base plate 1 has a pair of retainer members 17, 17' with parts thereof lying over the hole portion 16, 16'. The moveable ejector plate 7 has openings 13, 13' that receive the retainer members 17, 17'. The opening 13 has a rear end 140 that can abut the retainer member 17 to limit forward movement of the ejector plate.

The above-described arrangement, wherein the lever is formed of sheet metal with downwardly-depressed walls forming a shaft 20 and with an hourglass hole 15 that receives a claw formed in the ejector plate, and the provisions of holes in the base plate 1 to accommodate the moving parts, enables the moveable parts including the lever 8 and ejector plate 7 to be of simple construction and to be mountable in a very simple manner, while enabling the card connector to be constructed with a small thickness or height to enable its use in thin electronic devices that are to receive memory cards.

When a memory card is inserted into the card connector, it is important to discharge any static electric buildup on the card prior to the card contacts 40 engaging the connector contacts 118. Applicant constructs the card 5 with a conductive strip indicated at 140 on the lower surface of the card. The ejector plate 7 is formed with a slot 142 that leaves a leaf spring 12 that is bent at an upward-rearward incline, and with its rear end curved down. As the card is inserted, the conductive strip 140 on its lower surface firmly engages the leaf spring 12 to discharge any static electricity to the ejector plate 7. The ejector plate 7 is itself ground by grounding members 27 which lie in base plate holes 19 and which are biased upwardly to bear against the lower surface of the ejector plate 7 during forward and rearward movement of the ejector plate. Of course, the grounding members 27 are electrically connected to grounded portions of electrical circuitry (not shown) in the electrical device in which the card connector is mounted.

As mentioned above, the ejector plate 7 and lever 8 are each formed of pieces of sheet metal that have been bent as shown. The base plate 1 can be formed of injection-molded thermoplastic material, with the retainer members 17, 17' formed integrally therewith, and with the base plate fixed to the rest of the housing 100 of the card connector. To facilitate mounting of the first lever end 122 on the eject button 21, the lever first end 122 is bent downwardly to lie against the lower surface of the eject button, and is provided with a cutout 22 that receives a shaft 9 that is fixed to the eject button. The base plate 1 is formed with additional hole portions 16a, 16'a and corresponding retainer members 17a, 17'a and a shaft-receiving hole 18a. These additional parts enable the base plate as well as the lever and ejector plate to be used with the card ejector wherein the eject button is on the right side of the card connector rather than the left side.

Figure 8:
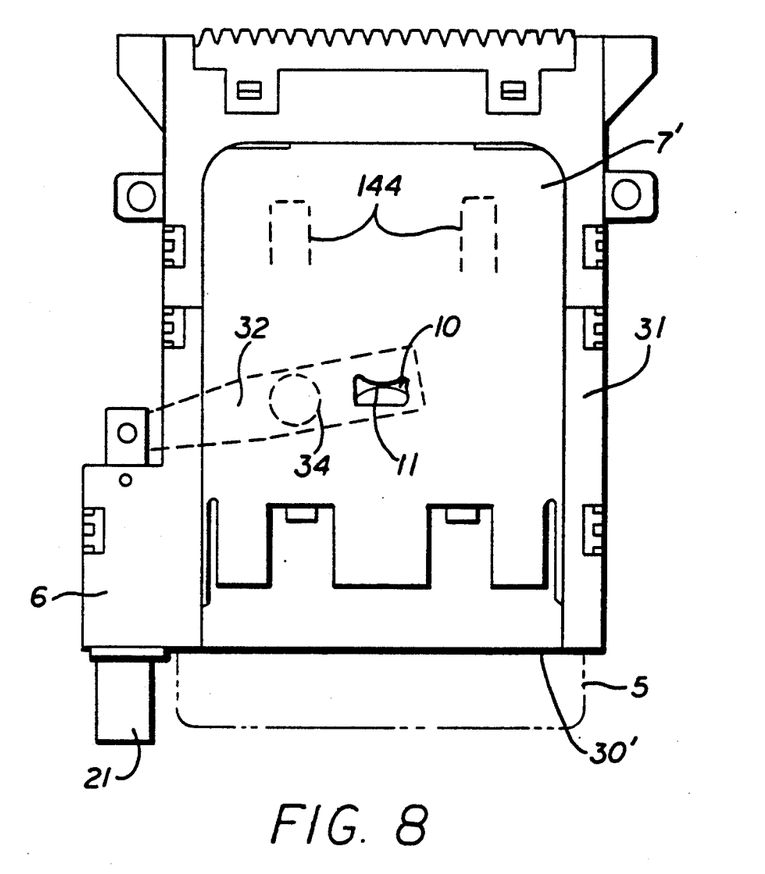
FIG. 8 is a plan view of a card connector constructed in accordance with a second embodiment of the invention.

FIG. 8 illustrates a second embodiment of the invention, wherein the fixed base plate 30' is formed of a metal sheet, and has slots forming a pair of leaf springs 144 extending at an upward and rearward incline to bear against the lower surface of the ejector plate 7'.

Figure 9:
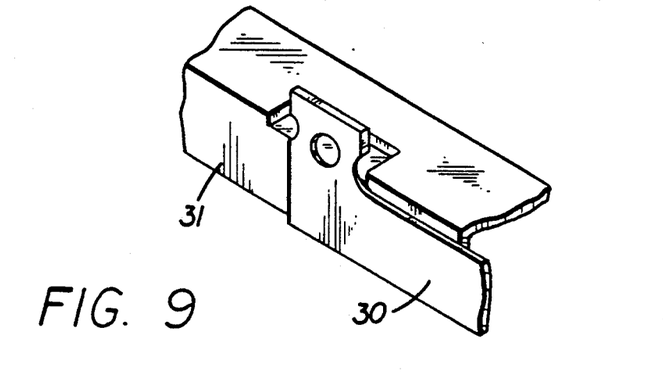
FIG. 9 is a partial isometric view of the card connector of FIG. 1 showing the assembly of the fixed plate and guide frame.
Figure 10:
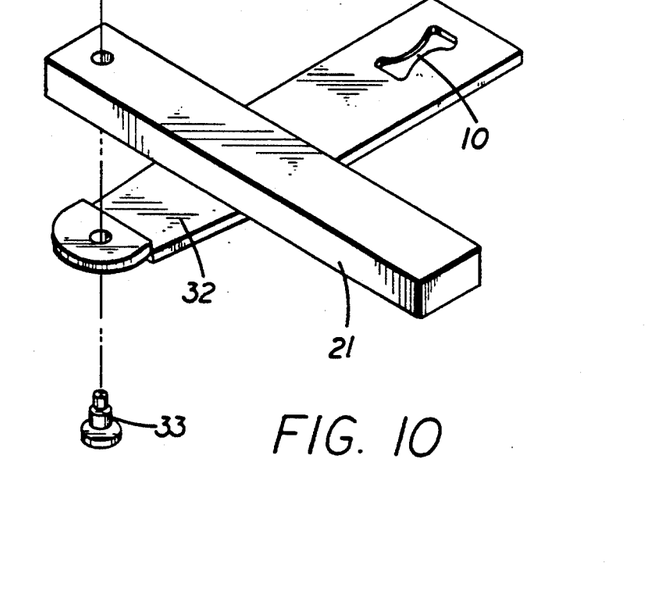
FIG. 10 is a partial exploded isometric view of the card connector of FIG. 8, showing the manner of connection of the lever and eject button.
Figure 11:
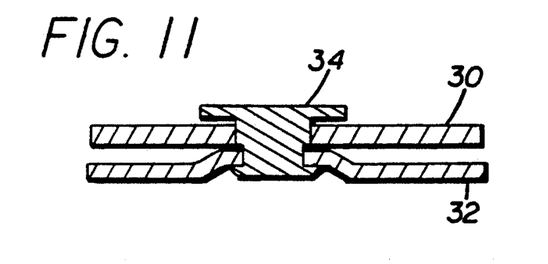
FIG. 11 is a partial sectional view of the assembly of FIG. 10, shown in an assembled condition.

FIG. 9 shows the manner in which the base plate 30' can be fixed to a plastic molded guide frame 31 that guides the moveable plate and card in forward and rearward movement. FIG. 10 shows how the eject button 21 and lever 32 can be held together, by a rivet 33 that projects through corresponding holes in them. FIG. 11 shows another rivet 34 pivotally connecting the middle of the lever 32 to the fixed metal plate 30.

Figure 12A:
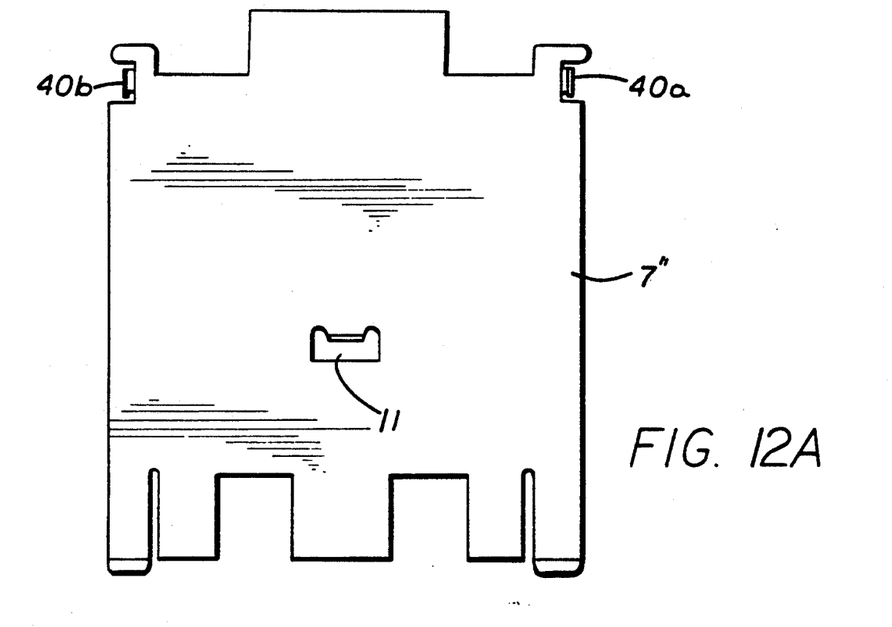
FIG. 12A is a plan view of a moveable plate constructed in accordance with a third embodiment of the invention.
Figure 12B:
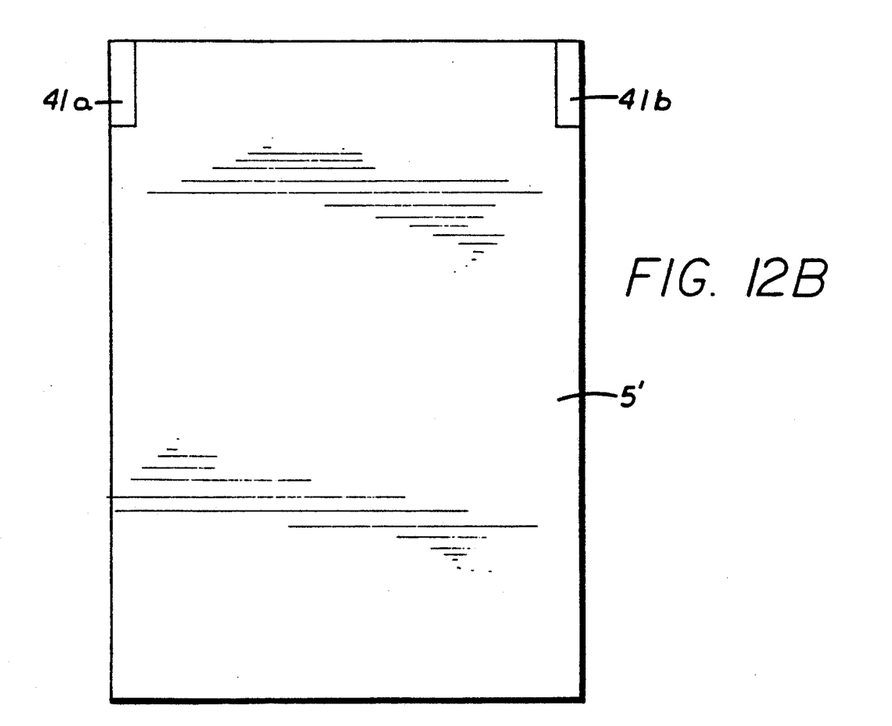
FIG. 12B is a plan view of a card constructed for use with the moveable plate of FIG. 12A.

FIG. 12A shows another moveable ejector plate 7" which is formed with a pair of card engaging sections 40a, 40b. FIG. 12B shows the rear surface of a card 5' which has recesses 41a, 41b which receive the engaging sections 40a, 40b of the ejector plate.

Thus, the invention provides a card connector which accurately ejects a closely slidably guided integrated circuit card, in a construction that enables a minimum of low cost and easily assembly parts to be used to form a card connector of low height and high reliability. An ejector plate that is slidably guided in forward and rearward movement in the card connector housing, has a downwardly bent claw that engages an aperture in a lever to interconnect the ejector plate and lever. The lever aperture has a convex rear edge that presses the claw forwardly as the lever pivots. The middle of the lever has a downwardly depressed portion forming a shaft that lies in a hole of a base plate of the housing to pivotally mount the lever on the housing. The lever also has a pair of holddown portions that lie under retainer members of the base plate. The arrangement enables the lever to be closely sandwiched between the ejector plate on top and the base plate underneath and to allow these parts to be easily and reliably coupled together. The ejector plate can be formed with a pair of upstanding pushout tabs at opposite sides of its rear end to engage the rear edge of a card, and can be formed with an upwardly-rearwardly incline leaf spring to discharge the card as it is inserted. At least one grounding member can be mounted on the base plate and upwardly biased to engage the under side of the ejector plate.

It should be noted that while terms such as "vertical", "upper", "lower", etc. are used herein to aid in the description of the invention, it should be understood that the card connector and its parts can be used in any orientation with respect to gravity.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. An ejector-equipped card connector for receiving and ejecting a an integrated circuit card that has a rear end with laterally-spaced opposite side portions and with a plurality of card contacts, comprising:
    a housing having a forward portion, and having a rear portion with multiple electrical connector contacts that mate with said card contacts, said housing including a guideway that guides said card in rearward sliding movement towards said connector contacts;
    an eject button mounted in said housing;
    a lever having a middle pivotally mounted on said housing, a first lever end pivotally coupled to said eject button, and a second lever end;
    a moveable plate lying primarily in an imaginary plane above said lever and slidably guided in forward and rearward movement on said housing, said lever second end being coupled to said moveable plate so pivoting of the lever can move said plate forwardly, said moveable plate having a rear portion with a pair of pushout regions positioned to engage said opposite side portions of the rear end of said card;
    said lever second end having an aperture with forward and rear edges, with at least said rear edge having a forwardly-facing surface that is convex, and said moveable plate having a claw that is bent downwardly out of the plane of said moveable plate and that lies in said aperture, and which has a primarily rearwardly-facing and largely straight surface engaged with said aperture convex rear edge, so rearward pushing of said eject button causes said lever to pivot to push said moveable plate forwardly.

2. The card connector described in claim 1 wherein:
    said aperture is of largely hourglass shape so said forward and rear aperture edges are each convex.

3. An ejector-equipped card connector for receiving and ejecting a an integrated circuit card, comprising:
    a housing;
    a moveable eject button mounted on said housing;
    a moveable ejector plate which is moveable in said housing and which has a rear end with pushout regions that can engage said memory card to eject it;
    a lever which is coupled respectively to said eject button and said ejector plate, said lever being formed of a piece of sheet metal and having a downwardly deformed portion forming a lever shaft;
    said housing including a base plate with a hole that closely receives said shaft;
    said lever having a pair of holddown projections extending from opposite sides of said lever at a location adjacent to said lever shaft;
    said base plate having a pair of hole portions that each receives one of said holddown projections, and said base plate having a pair of retainer members each lying over part of one of said hole portions to lie over a portion of one of said holddown projections.

4. The card connector described in claim 3 wherein:
    said lever has an end portion which has an aperture with rear and forward edges that are each convex, and most said ejector plate extends substantially horizontal but said ejector plate has a downward-extending part that forms a claw that lies in said aperture, said claw having rearward and forward surfaces lying adjacent respectively to said rear and forward edges of said aperture.

5. An ejector-equipped card connector for receiving and ejecting an integrated circuit card that has a rear end with laterally-spaced opposite side portions and with a plurality of card contacts, comprising:
    a housing having a forward portion, and having a rear portion with multiple electrical connector contacts that mate with said card contacts, said housing including a guideway that guides said card in rearward sliding movement towards said connector contacts;
    an eject button mounted in said housing;
    a lever having a middle pivotally mounted on said housing, a first lever end pivotally coupled to said eject button, and a second lever end;
    a moveable plate lying primarily in an imaginary plane above said lever and slidably guided in forward and rearward movement on said housing, said lever second end being coupled to said moveable plate so pushing of said eject button causes pivoting of said lever to move said plate forwardly, said moveable plate having a rear portion with a pair of pushout regions positioned to engage said opposite side portions of the rear end of said card;

said moveable plate is electrically conductive and has at least one slot forming a leaf spring extending at an upward incline from said imaginary plane, to electrically contact the lower surface of said card.

6. An ejector-equipped card connector for receiving and ejecting an integrated circuit card that has a rear end with laterally-spaced opposite side portions and with a plurality of card contacts, comprising:

a housing having a forward portion, and having a rear portion with multiple electrical connector contacts that mate with said card contacts, said housing including a guideway that guides said card in rearward sliding movement towards said connector contacts;

an eject button mounted in said housing;

a lever having a middle pivotally mounted on said housing, a first lever end pivotally coupled to said eject button, and a second lever end;

an electrically conductive moveable plate lying primarily in an imaginary plane above said lever and slidably guided in forward and rearward movement on said housing, said lever second end being coupled to said moveable plate so pushing of said eject button causes pivoting of said lever to move said plate forwardly, said moveable plate having a rear portion with a pair of pushout regions positioned to engage said opposite side portions of the rear end of said card;

an electrically conductive grounding member mounted in said housing below said moveable plate away from said lever, and biased upwardly against said plate.

7. An ejector-equipped card connector for receiving and ejecting an integrated circuit card that has a rear end with laterally-spaced opposite side portions and with a plurality of card contacts, comprising:

a housing having a forward portion, and having a rear portion with multiple electrical connector contacts that mate with said card contacts, said housing including a guideway that guides said card in rearward sliding movement towards said connector contacts;

an eject button mounted in said housing;

a lever having a middle pivotally mounted on said housing, a first lever end pivotally coupled to said eject button, and a second lever end;

a moveable plate lying primarily in an imaginary plane above said lever and slidably guided in forward and rearward movement on said housing, said lever second end being coupled to said moveable plate so pushing of said eject button causes pivoting of said lever to move said plate forwardly, said moveable plate having a rear portion with a pair of pushout regions positioned to engage said opposite side portions of the rear end of said card;

said lever is formed of a piece of sheet metal, and said middle portion has a downwardly-depressed wall that extends downwardly and forms a lever shaft;

said housing has a hole that receives said downwardly-depressed lever shaft to pivotally mount said lever middle on said housing.

8. The card connector described in claim 7 wherein:

said lever middle portion has a pair of opposite holddown projections projecting in opposite directions and having ends, with each holddown projection bent so its end lies below the level of most of said lever middle portion;

said housing having a pair of hole portions that each receives one of said holddown projection ends and a pair of holddown retainer portions which each lies above a corresponding one of said holddown projection ends, to hold said lever against said housing.

* * * * *